United States Patent [19]
Guthrie et al.

[11] Patent Number: 6,161,185
[45] Date of Patent: Dec. 12, 2000

[54] PERSONAL AUTHENTICATION SYSTEM AND METHOD FOR MULTIPLE COMPUTER PLATFORM

[75] Inventors: R. Scott Guthrie; Charles E. Waid, Jr., both of Colorado Springs, Colo.

[73] Assignee: MCI Communications Corporation, Washington, D.C.

[21] Appl. No.: 09/036,290

[22] Filed: Mar. 6, 1998

[51] Int. Cl.[7] .................................................. G06F 17/30
[52] U.S. Cl. .............................. 713/201; 707/2; 709/229
[58] Field of Search .................................. 713/201, 200; 707/2, 204; 380/48; 709/229

[56] References Cited

U.S. PATENT DOCUMENTS

| | | | |
|---|---|---|---|
| 5,557,515 | 9/1996 | Abbruzzese et al. | 364/401 |
| 5,594,227 | 1/1997 | Deo | 235/380 |
| 5,751,812 | 5/1998 | Anderson | 380/48 |
| 5,757,916 | 5/1998 | MacDoran et al. | 380/25 |
| 5,864,676 | 1/1999 | Beer et al. | 395/200.59 |
| 5,884,298 | 3/1999 | Smith, II et al. | 707/2 |
| 5,935,246 | 8/1999 | Benson | 713/200 |
| 6,000,033 | 12/1999 | Kelley et al. | 713/201 |

*Primary Examiner*—Albert De Cady
*Assistant Examiner*—Omar Omar

[57] ABSTRACT

A personal authentication system provides at least two levels of security for an authentication process, in addition to numerous other security features. The system operates across many different software and hardware platforms, in a client/server fashion, employing a challenge/response process that does not require users to transmit their passwords across a network. An application running on a client computer is coupled with an application running on a server computer. The client generates a response to a challenge, which is provided by the server. The response is a combined function of the server's challenge, a serial number assigned to the client, and a password provided by the user.

27 Claims, 17 Drawing Sheets

PERSONAL AUTHENTICATION SYSTEM AND METHOD FOR MULTIPLE COMPUTER PLATFORM

TECHNICAL FIELD

The present invention relates generally to electronic access systems and more particularly to electronic access systems in computers.

BACKGROUND OF THE INVENTION

Access to confidential and proprietary areas are often performed using electronic access systems. Electronic access systems are typically required to access a network, network resources (e.g., servers, modems, etc.), software applications running on servers, Internet or World Wide Web pages, databases, files or other electronic data. Electronic access systems are particularly important with individual or networked computers that store confidential information.

Other electronic authorization systems have been developed to authenticate human users, generally with the use of personal passwords. However, these electronic access systems provide only a limited level of security since they rely on authenticating a user account identifier and password, thereby providing only one level of such security. An unauthorized user may obtain an authorized user's password and account identifier and thereby inappropriately access the system.

An ideal electronic access system performs user authentication, rather than simply machine or system authentication. In other words, such an electronic access system authenticates individuals or users who may access the system, rather than a system that has been pre-programmed with access information (e.g., running a "script" to permit access). Such an electronic authorization system, to maintain security, must ensure that only authorized users are allowed access to the system.

Certain personal authentication systems are available, such as fingerprint identifiers, retinal scan devices, etc. Such personal authentication systems, however, are typically very expensive and inapplicable to many environments. For example, such fingerprint or retinal scan identification devices are difficult or expensive to employ in a large network of computers, including a network where users may access the network from various geographic locations (e.g., via standard phone lines using a modem and lap top computer).

A lower cost system employs secure identification (ID) cards within a personal authentication system. Such a personal authentication system requires use of a physical card having an algorithm which generates a random code at predetermined intervals (e.g., every 10 seconds). A server computer (or "server") employs the same algorithm to generate the same code at the same predetermined interval. Aspects of the generated code are unique to the card. Thus, a user must possess the card to obtain authentication by the server. However, if the card is lost or damaged, the user cannot be authenticated. Additionally, unauthorized users could simply obtain the card and thereby gain access to the system. Furthermore, the card requires a battery to energize its internal circuitry. Therefore, the card has a limited life, after which time a new battery must be inserted.

Another personal authentication system employs a software solution known as "Softkey." The Softkey system provides a challenge to a user provided by a server, to which the user must respond, typically by means of a client computer (or "client") coupled to the server. When a user initially logs into the server, the server, for example, selects eight words from a table of words, where each word has four to eight characters. The user must then type in each of the eight words. As a result, the user must type 24 to 64 characters in a response to the server's challenge. The server generates the same eight words, and compares the eight words it receives from the client to those locally generated. If the two match, then the user is authenticated.

One problem with the Softkey system is that the user must correctly enter the eight words, requiring up to 64 keystrokes. Such a response by the user can be time consuming and tedious for non-touch typists. Additionally, the Softkey system suffers from additional limitations which make it not sufficiently robust for use in protecting highly confidential information on a computer network or in other suitable environments.

SUMMARY OF THE INVENTION

An exemplary embodiment of the present invention provides numerous security and utility features. Alternate embodiments need not include all such features, and may include as few as one of such features. In contrast to the Softkey system, the exemplary embodiment provides a user interface that is easy to use without sacrificing security. Users employ a password that does not change each time a user authenticates with a server. As a result, users can remember their passwords more easily. The exemplary embodiment automatically locks out a user for a time out period where the user has attempted authentication for a predetermined number of successive attempts and failed. As the number of authentication failures increases, the time out period increases.

User passwords expire after a predetermined period of time, thereby requiring users to change their passwords. The exemplary embodiment provides users with sufficient notice before their passwords expire. For users who do not frequently access the system, a predetermined number of system accesses are permitted before being locked out from the system after the password time period has expired, during which users can change their password.

User accounts in the exemplary embodiment may be set to automatically expire at predetermined times without direct intervention by a system administrator, to thereby provide specialized accounts for certain users. Again, such users are provided with sufficient notice before their accounts expire.

Under the exemplary embodiment, the server accepts only a single one-time password value which expires within a short period of time to thereby foil a malicious user's attempt at "hammering" the authentication system with responses attempting to stumble upon a correct password and gain access.

Additionally, the exemplary embodiment employs a robust encryption or security algorithm, which is maintained in secrecy by the server.

Each client is provided with a separate calculator that is customized for the user. The client calculator is sufficiently generic so that it can be easily portable to various computer systems. The client calculator is also readily available and provided to a wide variety of users. Additionally, the client calculator, as well as a corresponding calculator on the server, are not compute intensive. Instead, the central processing unit (CPU) and input/output (I/O) processing requirements for the calculators are minimal under the exemplary embodiment so that authentication can be calculated in substantially less than one second.

Passwords are stored on the server in an encrypted manner within internal system tables. As a result, an unauthorized user cannot simply observe the raw data to obtain usable information. Each account for a given user has an associated account type value. As a result, user accounts are thereby distinguishable and may have varying levels of security, access, size, etc. The exemplary embodiment employs multiple servers. Each server automatically updates a given change made by another server (e.g., database mirroring). Furthermore, data transmitted over the network from one server to another is not sent as clear text, but is instead, for example, encrypted.

BRIEF DESCRIPTION OF THE DRAWINGS

FIG. 11b is a logical block diagram for the embodiment of FIG. 11a.

DETAILED DESCRIPTION OF THE INVENTION

Figure 1A:
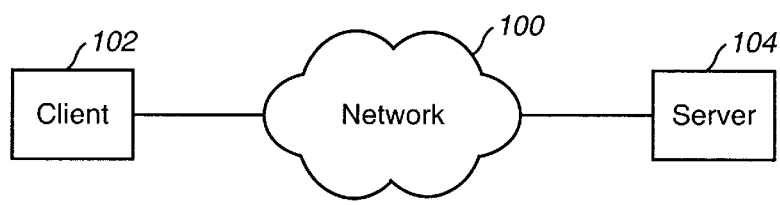
FIGS. 1a and 1b are block diagrams showing two environments for incorporating an exemplary embodiment of the present invention.

An electronic access system, and in particular, a method and apparatus for authenticating users of a computer, is described in detail herein. In the following description, numerous specific details, such as security algorithms, ordering and execution of steps, hardware components, etc., are presented in order to provide a thorough understanding of the present invention. One skilled in the relevant art, however, will readily recognize that the invention can be practiced without using the specific details described herein, or with other specific steps in a routine, different security algorithms, different hardware, etc. Well-known structures and steps are not shown or described in detail in order to avoid obscuring the present invention.

As explained herein, an exemplary embodiment of the present invention provides a personal authentication system that may be combined with a system's conventional authentication procedures to provide at least two levels of security, in addition to other security features. A conventional first level of security requires, e.g., a user to provide an account identifier and corresponding account password to initially log on to or access the server. Thereafter, the exemplary embodiment provides a second level of security under a challenge/response process. The personal authentication system can operate across many different software and hardware platforms in a client/server fashion, and is based on a challenge/response process that does not require users to transmit certain important authentication information across the network.

The exemplary embodiment is embodied in an application running on a client computer coupled with an application running on a server computer. The applications both include a "calculator" which generates a unique response based on a seed value. The server provides an initial seed value or "challenge" during each request for access. The client employs the challenge, together with a unique serial number assigned to the client's calculator and an authentication password provided by the user, to generate a response. The server calculator similarly generates a response. The client transmits its generated response to the server which compares the received response to the locally generated response to authenticate the user. As a result, the user's authentication password is never transmitted over the network where it could be exposed or compromised.

The exemplary embodiment provides several additional security features. The server's calculator locks out a user and denies access after a certain number of failed attempts and denies access for a certain period of time. The time period increases for each series of failed attempts, thereby preventing an unauthorized user from using a random code generator to generate a correct response value. Account passwords expire after a selected period of time (typically measured in weeks) and the response generated by the client's calculator is invalid (even if correct) after a short period of time (typically measured in minutes). The client and server calculators employ a secured, one-way hashing algorithm which is difficult, if not impossible to reverse compute. The hashing algorithm employs a unique serial number assigned to the client's calculator to thereby customize each client's calculator. A user can have multiple copies of the client calculator (e.g., on home, office, portable, etc. computers), where each copy contains the same serial number. Thus, the serial number together with the user's password provide authentication of the user. The exemplary embodiment also provides other important features described herein.

Referring to FIG. 1a, a network 100 has coupled thereto a client 102 and a server 104. The server 104 may be implemented on a high-grade, mid-range computer, such as the IBM RS/6000 from International Business Machines Corporation, a DEC alpha-based computer from Digital Equipment Corporation, or Windows NT systems. Alternately, the server 104 may be a much smaller computer such as a DOS-based personal computer (PC). A software routine running on the client 102, together with a similar software routine running on the server 104, authenticate a user of the client, as explained more thoroughly below. An exemplary embodiment of the present invention authenticates a user of the client 102 to permit the user access to the server 104, as well as access to any resources on the server, such as software applications, files and databases.

Messages and other data are exchanged between the client 102 and the server 104 via the network 100. The network 100 may be a public switched telephone network (PSTN), such as in a dial-in or other access configuration. Alternately, the network 100 may be a transmission control protocol/internet protocol (TCP/IP) based network, such as the Internet or a corporate intranet. The network 100 may also be a private line network, local area network, or any other network for exchanging messages.

Figure 1B:
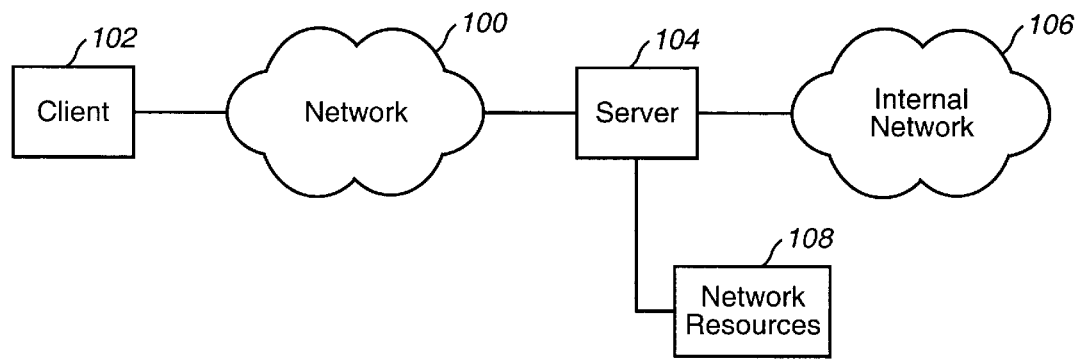

Referring to FIG. 1b, an alternative system incorporating an exemplary embodiment of the present invention includes an internal network 106 coupled to the server 104. The internal network 106 may be a corporate internal network, such as a corporate intranet. Additionally, network resources 108 are coupled to the server 104. Network resources may include modems, other servers, printers, and other hardware, or software resources to which the client 102 desires access (via the server).

Figure 2:
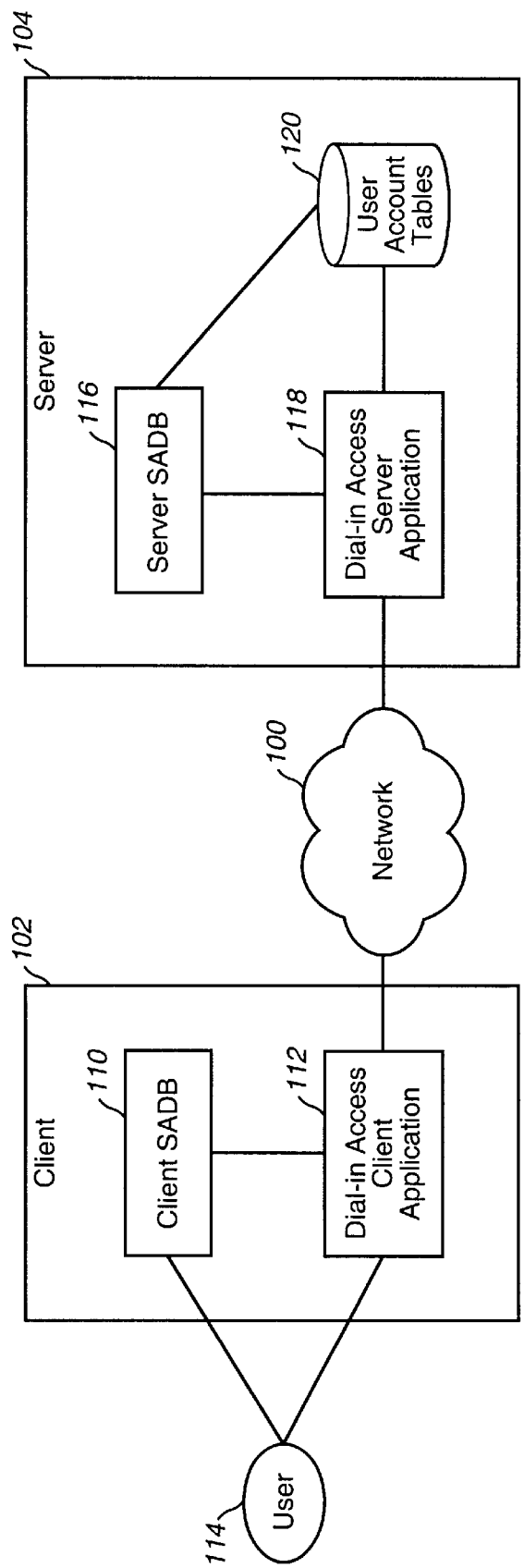
FIG. 2 is a logical block diagram of a client and a server employing aspects of the exemplary embodiment.

Referring to FIG. 2, the client 102 includes a client Secure Authentication DataBase (SADB) calculator 110 and a client application 112 with which a human user 114 interacts. In the exemplary embodiment, the client SADB calculator 110 is a software-based authorization facility; however, a hardware based calculator may be employed, such as a card or chip to be coupled to the client 102. The client application 112 provides a conventional communication with the server 104 over the network 100 (e.g., dial-up connection over the PSTN). If the network 100 is the Internet or other TCP/IP network, then the client application 112 is a TCP/IP interface and web browser for internet access to the server 104.

The client SADB calculator 110 provides a second level of authentication for the user 114 under a challenge/response routine, as described below. The server 104 similarly includes a server SADB calculator 116, and a server application 118, e.g., a dial-in application. Instead of dial-in access applications, the applications 112 and 118 may be other methods and/or apparatuses for establishing communications between the client 102 and server 104. The server 104 also includes a user account database 120 which includes tables of user accounts, including account IDs. The server 104 may also include a database having account passwords with associated account ID's to provide a first level of authentication, in a manner similar to that found in conventional password protected systems, but with additional functionality.

The user 114 must initially establish an account with the server 104, which is stored in the user account database 120. For example, the user 114 initially establishes an account with the server 104. The user 114 receives a user account ID and receives (or provides) an account password.

After establishing an account, the user 114 receives a copy of the client SADB calculator 110. The user 114 can obtain the client SADB calculator 110 by known software distribution methods, such as by downloading a copy of the SADB calculator from the server 104, or by accessing a web page over the Internet which permits a copy to be downloaded. The user 114 also receives a unique serial number for use with the client SADB calculator 110, such as from an account administrator. The user 114 thus has a SADB account and a corresponding user account ID. Typically, the user's account, and the user's SADB account differ, although such accounts could be stored together and be assigned the same user account ID.

The user 114 installs the client SADB calculator 110 on the client 102. During such installation, the client SADB calculator 110 prompts the user 114 to enter the serial number. The serial number is then stored internally in the client SADB calculator 110 as explained herein, and thus does not need to be memorized by the user 114 or input thereafter.

The user 114 may use more than one client computer 102 to access the server 104 (e.g., via a home computer, office computer, lap top computer, palm top computer, etc.). If so, then the user 114 installs a copy of the client SADB calculator 110 on each of such client computers and inputs the same serial number to each calculator. The user 114 can then access the server 104 and be authenticated with the same account ID, passwords, etc., no matter which client computer the user employs.

Figure 3:
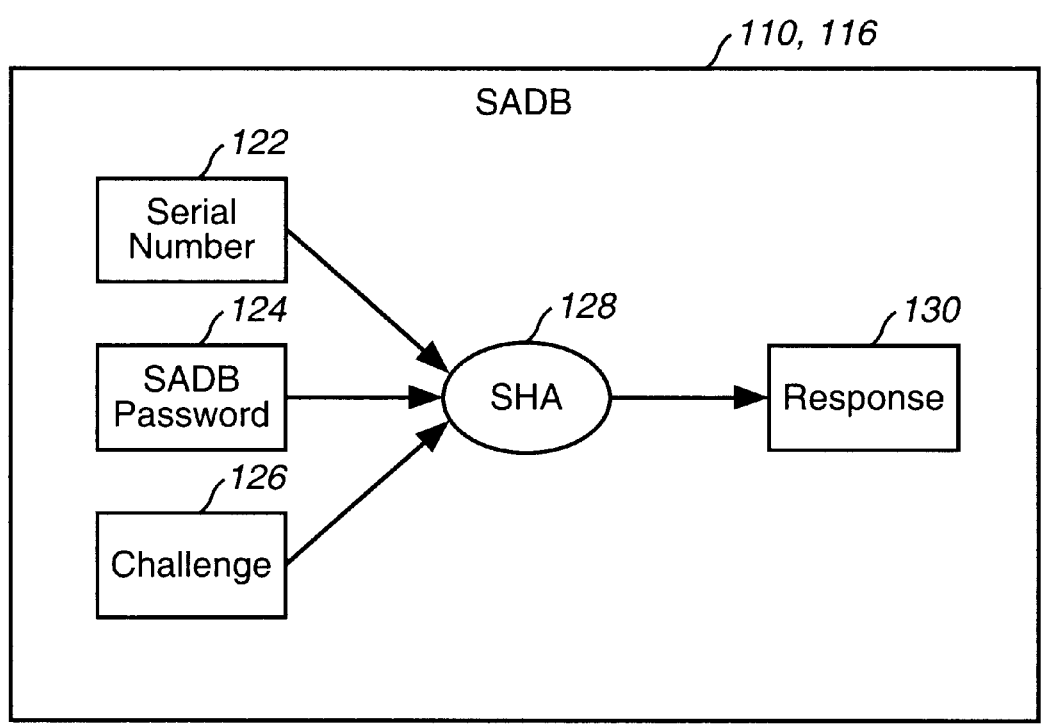
FIG. 3 is a block diagram illustrating a logical process performed by the exemplary embodiment.

Referring to FIG. 3, a simplified logical diagram of a process performed by the client and server SADB calculators 110 and 116 is shown. Initial data or vectors include a serial number 122 previously input by the user (as discussed above). Additional initial data includes a user's authentication or SADB password 124 and challenge data 126 (described below), which are input together with the serial number 122 to a secured hashing algorithm (SHA) 128. As is known, a SHA is a one-way hashing algorithm which generally cannot be reverse computed. Therefore, the input to the SHA 128 (e.g., the SADB password 124) cannot be determined from the output. By employing the serial number 122, SADB password 124 and challenge 126, the SHA 128 generates a unique response 130. The SHA 128 can be configured to provide a desired format and length response 130, such as a five or six character response. A response 130 which includes too many characters can be difficult for the user to employ.

In the exemplary embodiment, the serial number 122 employs only numeric and capital alphabetic characters, and the letters "O," "I" and "L," as well as the numbers "1" and "0," are prohibited to eliminate potentially confusing (as look-alike) letters and numbers. Additionally, the serial number does not include any vowels. Therefore each character in the serial number 122 can have only one of 28 values. As a result, if the serial numbers distributed to the users are randomly generated, profane or other inappropriate words are not accidentally created. The serial number 122 need not be a unique value. The SHA 128 similarly avoids the letters "O", "L", "I", the digits "0" and "1", and vowels when generating the response 130.

The SADB password 124 may be automatically generated by the server 104, but may later be altered by the user. The system preferably requires that the SADB password 124 satisfy one or more of the following based on the security policy in effect: a minimum length in characters; a required mix of characters (e.g., requiring at least some number of characters from some number of the groups of upper case, lower case, numerics, special characters); non-reuse of previously used passwords, etc. The SADB password 124 is the user's "secret" which expires and must be changed. Typical lifetimes for the user's authentication password range from a week to several months, depending upon security policy requirements for the system. Since the SADB password is provided by the user during authentication, users often wish to personalize their passwords.

Conversely, the challenge 126 is generated by the server 104 and provided to the client 102. The challenge is preferably randomly generated. For example, the challenge may be a string of eight alphanumeric characters or digits. The eight digit challenge value 126 provided by the server 104 is used to create a different response value 130 for each authentication attempt made within the time-frame that the user's SADB password 124 remains unchanged.

The serial number 122 and SADB password 124 are stored in the user's account table in the user account database 120. Using the same serial number 122, SADB password 124 and challenge 126, both the client and server SADB calculators 110 and 116 should produce the same response 130. Therefore, the client and server SADB calculators 110 and 116 have the same input values to the SHA 128. The client 102 then transmits the response 130 produced by the client SADB calculator 110 to the server 104. The server 104 compares its internally generated response 130 with the response received by the client 102 to authenticate the user 114, as explained herein.

Figure 4:
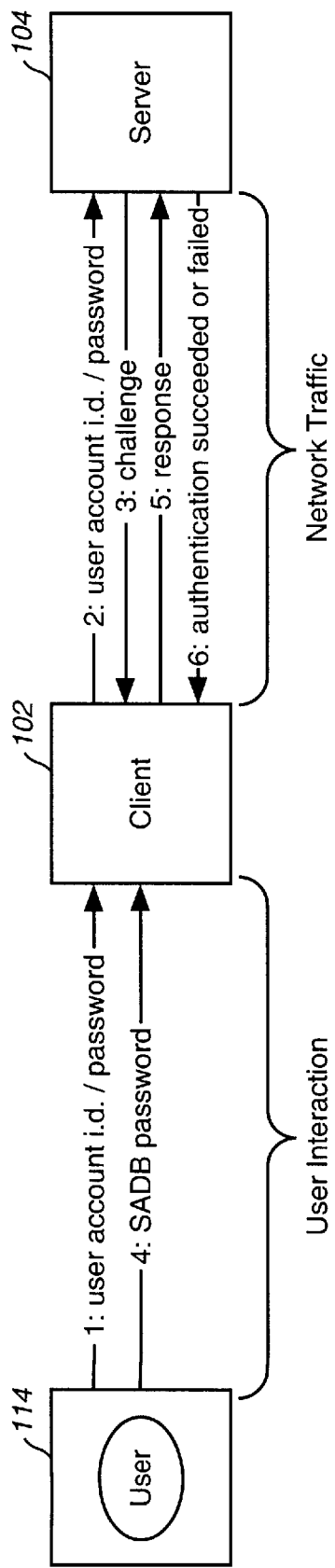
FIG. 4 is a block diagram showing data flows in the exemplary embodiment.
Figure 5:
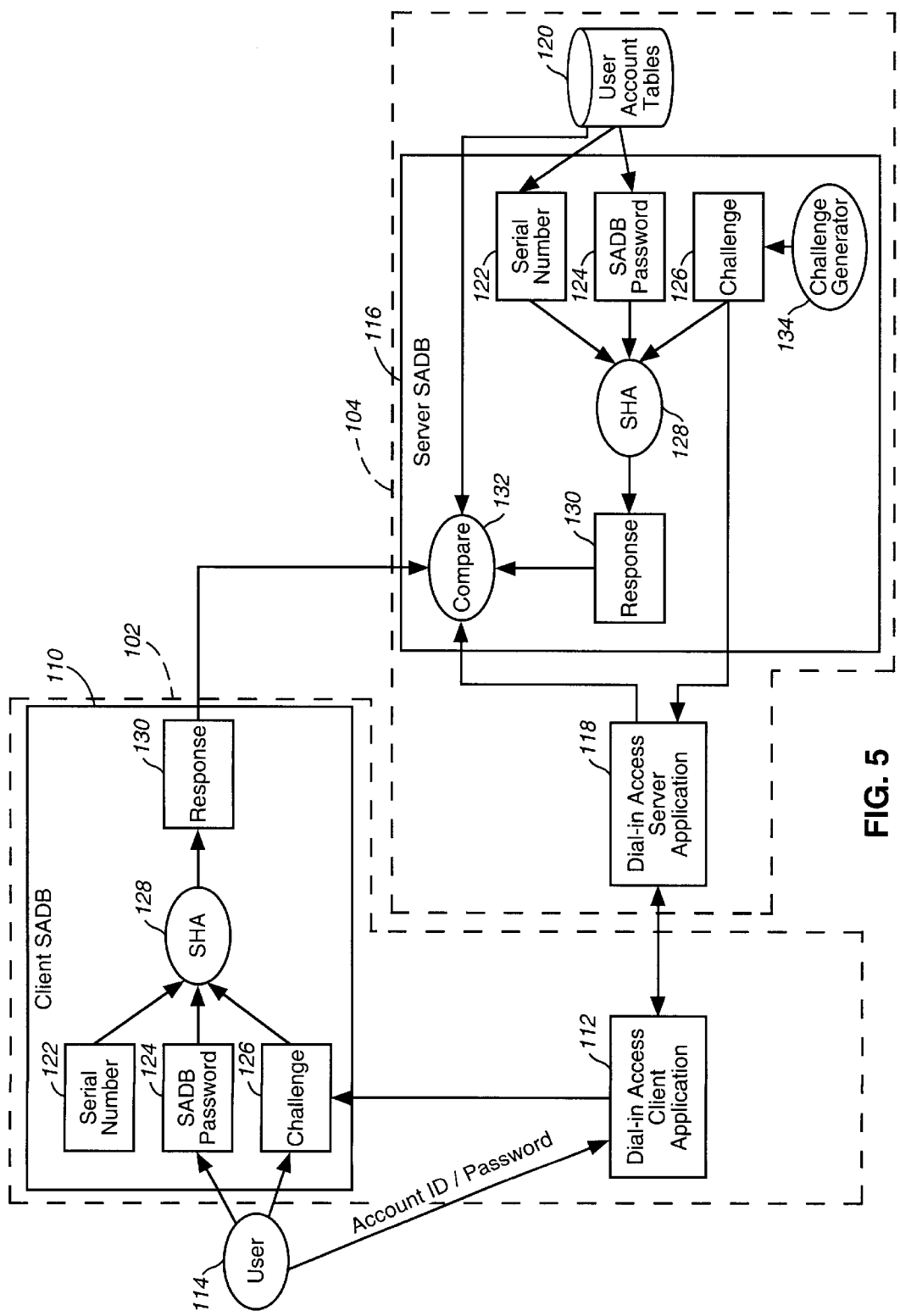
FIG. 5 is a logical block diagram showing a personal authentication process under the exemplary embodiment.

Referring to FIG. 4, six consecutive paths or flow of data under the exemplary embodiment are shown as enumerated as paths "1" through "6." As shown in FIG. 5, a logical representation of the authentication process under the exemplary embodiment is shown. Referring to FIGS. 4 and 5, if the system employs a conventional first level of authentication, then the user 114 initially inputs the user's account and correct password to the client 102. Secondly, the client 102, via the client application 112, transmits the user account and account password to the server 104. Third, the server 104 validates the user account and password against the user's account table stored in the user account database 120. If such initial validation is successful, then the server 104 employs a challenge generator 134 in its SADB calculator 116 to generate a challenge 126, such as a challenge having a length of approximately eight characters, and transmits the challenge to the client 102.

Fourth, the client SADB calculator 110 prompts the user 114 for the user's SADB password 124, which the user enters into the client 102. Additionally, the user 114 enters the received challenge into the client SADB calculator 110, either manually or by employing "cut" or "copy" and "paste" commands from a graphical user interface (GUI) display or other interface provided by the client to input the challenge into the client SADB calculator 110. Fifth, the client SADB calculator 110 generates, via the SHA 128, the response 130 using the challenge 126, SADB password 124, and the locally stored serial number 122. The client 110 transmits the response 130 to the server 104. Sixth, the server SADB calculator 116 employs a compare routine 132 to compare the receive response 130 with the response 130 locally generated by the server 104. The server 104 provides the client 102 with a message indicating whether the authentication succeeded or failed, and enables appropriate access if successful.

Referring to FIGS. 7a–7d, the second level of user authorization is shown in detail. The steps performed by the client 102 are shown in the left-hand column, while steps performed by the server 104 are shown in the right-hand column. Beginning in step 602, the user 114 initiates the "SADB" authentication process by providing his or her account ID. If the desired access corresponds to a system administrator function or other action requiring high priorities and access, then the client 102 generates a system administration (SysAdmin) request flag. The user account ID may have associated therewith a number designation or code indicating that the account corresponds to that of a system administrator or other account having high priorities, and thus requires successive re-authentication.

In step 604, the client 102 requests a SADB challenge from the server 104 by calling a generate challenge for user function within the server. The client 102 transmits the user's account ID and SysAdmin flag.

Figure 6:
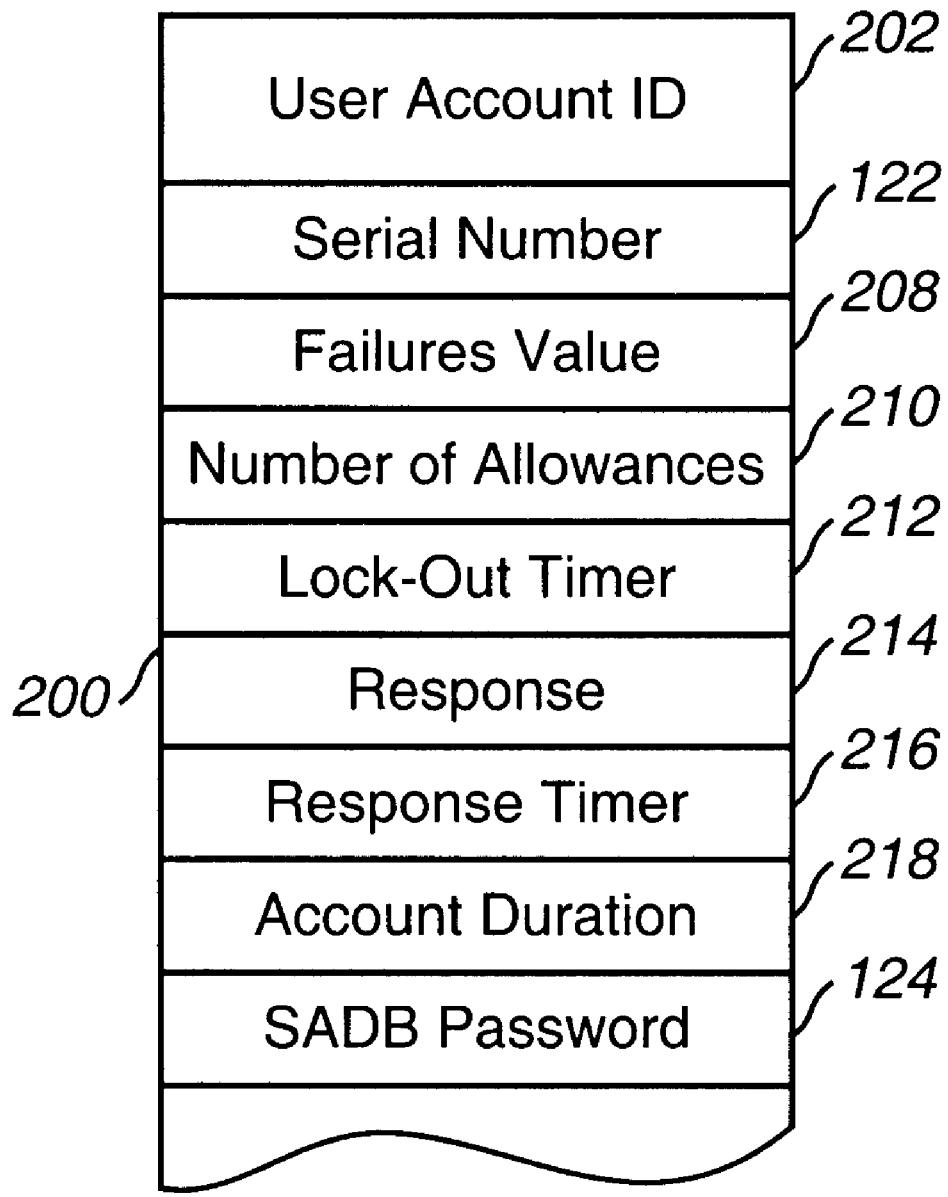
FIG. 6 is a schematic diagram of an exemplary user account table stored in a user account database, which forms part of the server of FIG. 2.

In step 606, the server 104 retrieves the corresponding user account table in the user account database 120 which corresponds to the user account ID received. For example, the server 104 retrieves a user account table 200 as shown in FIG. 6 and compares the received user account ID to a user account ID data structure or record 202. If the server 104 fails to retrieve a user account table, then the server 104 returns a failure message to the client 102 in step 607. In step 608, the client 102 provides a "bad password," "authentication failure" or other message to the user.

If the record for the given account ID is found, then in step 610 the server 104 determines whether a lock-out timer flag is active by reading a lock-out timer record 212 in the user account table 200 (FIG. 6). The lock-out timer flag is activated when the server 104 detects too many successive authorization failures in a row. The server 104 increments a failures value record 208 in the user's account table 200 each time the server recognizes an authorization failure. The failures value record 208 increments to form a "set" of failures. A set of failures typically consists of three or five consecutive failures.

After an initial set of failures, the server 104 establishes the lock-out timer at a fairly low duration, such as fifteen minutes, in the lock-out timer record 212. For each successive set of login failures, the lock-out timer period is increased, e.g., multiplied by two. Therefore, after the second set of failures, the lock-out timer is set to thirty minutes. The purpose of the lock-out timer is to thwart an unauthorized user from repeatedly "hammering" the server 104 manually or through an automated application with authorization attempts, while still eventually allowing a legitimate user access to the server 104 without intervention by the system administrator (as used generally herein, "login" and "authorization" are used interchangeably). The server 104 resets the failures value record 208 and the lock-out timer record 212 to zero every time a successful authentication is achieved. Only user authentication failures add to the number of successive login failures and thereby increase the failures values record 208 and the lock-out timer record 212; system problems causing an authentication failure do not increment these values. Both the number of failures for a "set" of failures values in the record 208 and the initial lock-out timer value 212 are configurable. Additionally, the multiplier for the lock-out timer value may be configured.

An example in pseudo code follows:

if (Number of failures) AND ((Number of Failures) mod (number in set) equals 0)

then the system has a set of failures. For example:

if (5 AND (5 mod 5==0))

the system can have a set. Alternately, the system can have a set as follows:

if (10 AND (10 mod 5==0)), or if (15 AND (15 mod 5==0)).

The system determines the set number by:

(set number)=(Number of Failures)/(number in set)

The lockout timer value could be set as follows:

(set timer value)=(set number)*(lockout delay)

The above may be replaced with any formula that increases the time value based on the number of sets.

For lockout time values, the above formula would yield the following times (as an example):

(1 set)*15 minutes=15 minutes (2 sets)*15 minutes=30 minutes (3 sets)*15 minutes=45 minutes If the lock-out timer flag is set, and not expired, then in step 612 the server 104 returns a failure message to the client 102. In step 614, the client 102 informs the user of such failure, for example, by displaying a message "Too many incorrect passwords have been attempted, please try later."

In step 616, the server 104 determines whether an account duration record 218 in the user account table 200 indicates that the account has expired. The account duration record 218 may be set to never expire, or to expire at a specified day and time, or for a specified duration (e.g., number of days). If the user's account has expired, then the server 104 in step 618 returns a failure message to the client 102. In step 620, the client 102 informs the user 114 to contact the system administrator, his manager, or another individual to re-enable the account, to thereby reset the account duration record 218.

In step 622, the server 104 determines whether the user's account will expire within X number of days, where X may be set to a predetermined number of days such as seven. Alternately, the value of X may be set based upon the user's account. For example, if the user accesses his account infrequently (e.g., once every other month), then X may be set to a value equal to approximately two months (assuming X is still less than the account duration value in the account duration record 218). The check done in step 622 helps inform the user before his account expires so that the user can request that the account be renewed. If the user's account will expire within X days or less, then in step 624 the server 104 returns an account expiration flag and a number of days to the client 102. In step 626, the client 102 informs the user 114 that his account will expire in n number of days (where n is less than X, and is the number of days until the account will expire).

Thereafter, or if the account will not expire within X days, then the server 104 in step 628 determines whether the user's password has expired and a number of "allowances" have been exhausted. The life of a password is configured by the server 104, and may be, for example, thirty days. An "allowance" permits the user 114 to be authenticated by the server 104, even if his or her password has expired. In other words, such allowances provide a way for the system to continue allowing authentication after certain preset time values have expired. Such allowances are useful for occasional users whose password expiration warning messages have been missed because no authentication request had been made during the expiration notification time. The system therefore allows a user to attempt to authenticate himself for a configurable number of allowances after his password expiration time value has passed. During such allowances, the user is expected to change his password after being authenticated by the server 104. The maximum number of allowances, for example, may be configured to a value such as three. The number of allowances should be greater than one because the user 114 may be dropped during a connection with the server 104, before he has had an opportunity to change his password.

If the password has expired with no allowances left, then in step 630 the server 104 returns a password expiration flag to the client 102. In step 632, the client 102 informs the user 114 that his password has expired and instructs the user to contact the system administrator. If the password is valid, then in step 634 the server 104 determines whether the password will expire with allowances remaining. If the password has expired, but allowances remain, then the server 104 in step 636 decrements the number of allowances in an allowance record 210 (FIG. 6), and in step 638 returns a password has expired flag to the client 102. In step 640, the client 102 informs the user 114 that his password has expired and instructs him to change his password. The client 102 can identify a web page or provide a hypertext link for the user 114, whereby the web page provides appropriate instructions and a subroutine for the user to change his password.

In step 642, the server 104 determines whether the user's password will expire within N days. If so, then in step 644, the server 104 returns a password expiration flag and a number of N days to the client 102. In step 646, the client 102 informs the user 114 that his password will expire in N days, and instructs the user to change his password (similar to step 640).

The number N of days is configurable, in a manner similar to the expiration of the user's account. However, the user's password frequently must be changed more often than his account must be renewed. For example, the password may be required by the server 104 to be changed every thirty days, and therefore, the value of N can be five days.

If the user's password will not expire within N days, or following step 640 or 646, the server 104 determines whether the current authorization request is for a system administration authentication. If so, then the server 104 determines whether the user's account corresponds to a SysAdmin account. For example, the server 104 can determine whether the user's account has a predetermined value greater than zero (e.g., a prepended or postpended value coupled to the user account ID record 202, or within a separate record in the record 200). If the server 104 determines that the user's account does not correspond to a SysAdmin account, then in step 652 the server returns a not a SysAdmin account flag to the client 102. In step 654, the client 102 informs the user 114 that he does not have system administrator authentication access.

If the current authorization request is not for system administration authentication under step 648, or the user's account corresponds to a SysAdmin account, then in step 656, the server 104 generates an eight digit or character challenge value (i.e., the challenge 126). The challenge 126 is a random value with some modifications to ensure certain patterns do not appear (e.g., profane words or confusing numbers or letters such as "L", "O", "I", "1", and "0"). In step 658, the server 104 calculates an expected response value (i.e., response 130 of FIG. 5) based on the serial number 122 and SADB password 124 from the user's account table 200, and the challenge 126. In step 660, the server 104 sets a response valid timer. The response valid timer is set to a short duration, such as two minutes. As explained below, the response valid timer provides a limited duration within which the user 114 must generate the appropriate response. In step 662, the server 104 updates or writes the expected response value into a response record 214, and the response valid timer value in a response timer record 216 of the user's table 200. In step 664, the server 104 determines whether an error occurred in attempting to update the expected response record 214 and response timer record 216. If the server 104 determines that an error had occurred, for example, if the server currently is experiencing an abnormally high number of authorization requests and therefore the server SADB 116 is overloaded, then the server in step 666 returns an internal SADB error flag to the client 102. In general, if the system fails to update the record or otherwise recognizes any internal errors in the SADB system, the system notifies a system administrator or other support people. For example, the server 104 generates an email message to each of the appropriate support people to report the error and report other information helpful in identifying and repairing the problem. In addition, the server 104, if coupled to a paging system (not shown), generates messages which are sent to the pagers of the support or development people to immediately inform them of an unexpected failure. Such page notification may be configurable and/or based on a type or level of failure. For example, the system can have three results for differing levels of failure. The first level of failure simply results in the logging of the failure. A higher level of failure results in the sending of an email, as well as the logging of the failure. Finally, a highest level of failure results in the sending of a page, as well as the sending of an email and the logging of the failure.

If a failure was recognized in step 664, then in step 668, the client 102 informs the user 114 to attempt authorization at another time, possibly indicating that the server is currently busy. If no error occurred in updating the expected response record 214, then the server 104 in step 670 returns the eight digit challenge value 126 to the client 102. In step 672, the client 102 passes the eight digit challenge value 126 to the client SADB calculator 110.

Figure 8A:
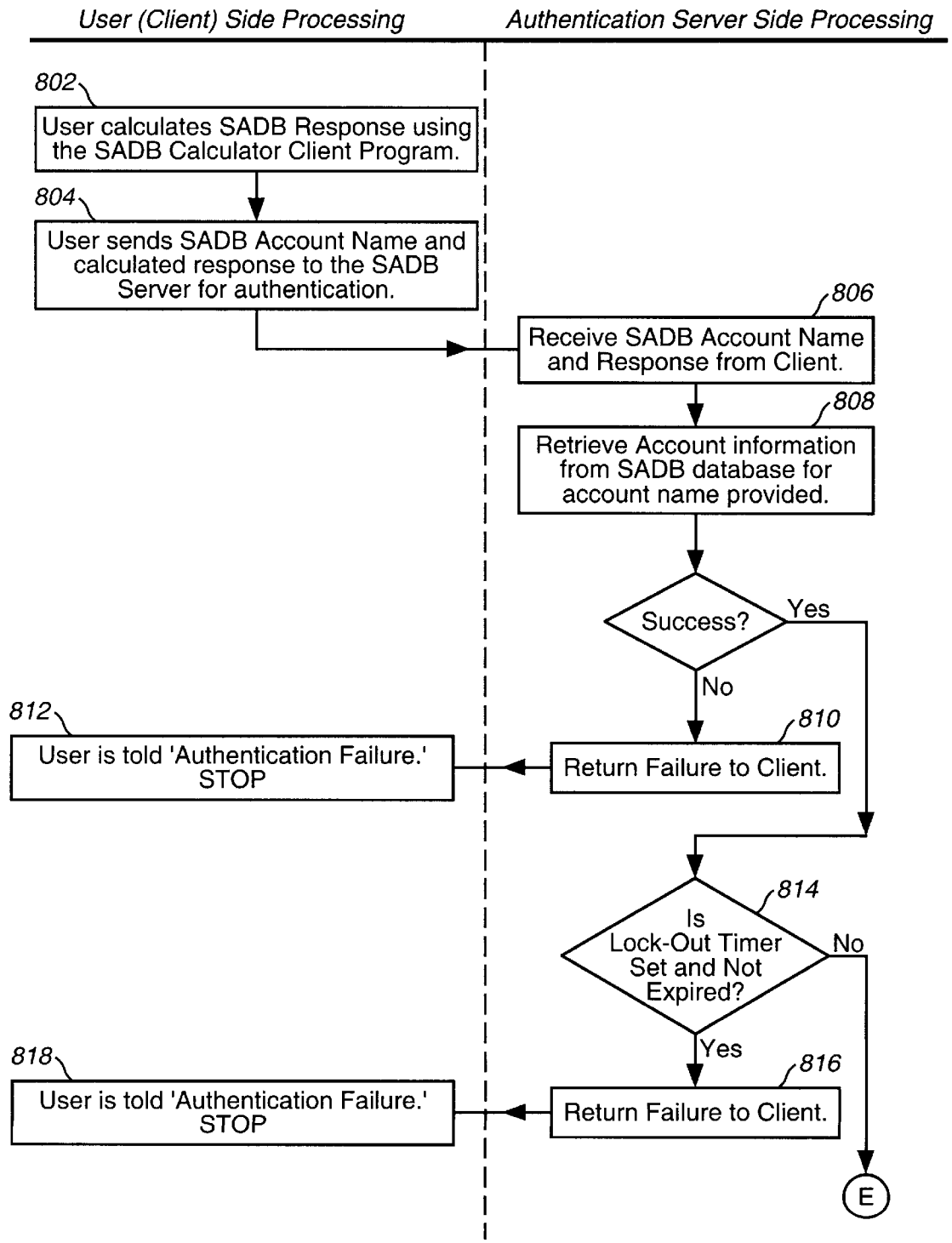
FIGS. 8a, 8b and 8c together form a flowchart diagram showing a second path of the personal authentication process under the exemplary embodiment.
Figure 8B:
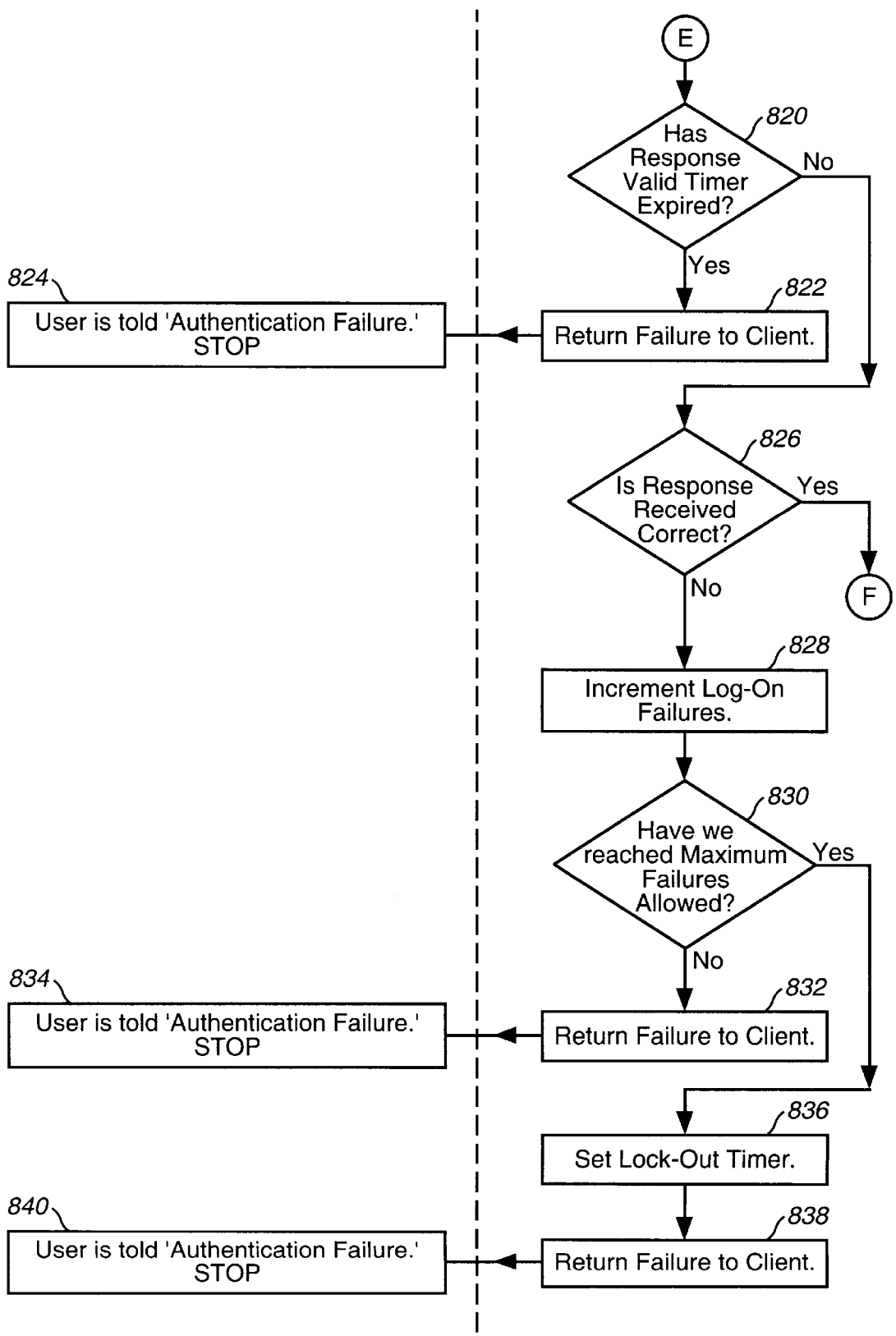
Figure 8C:
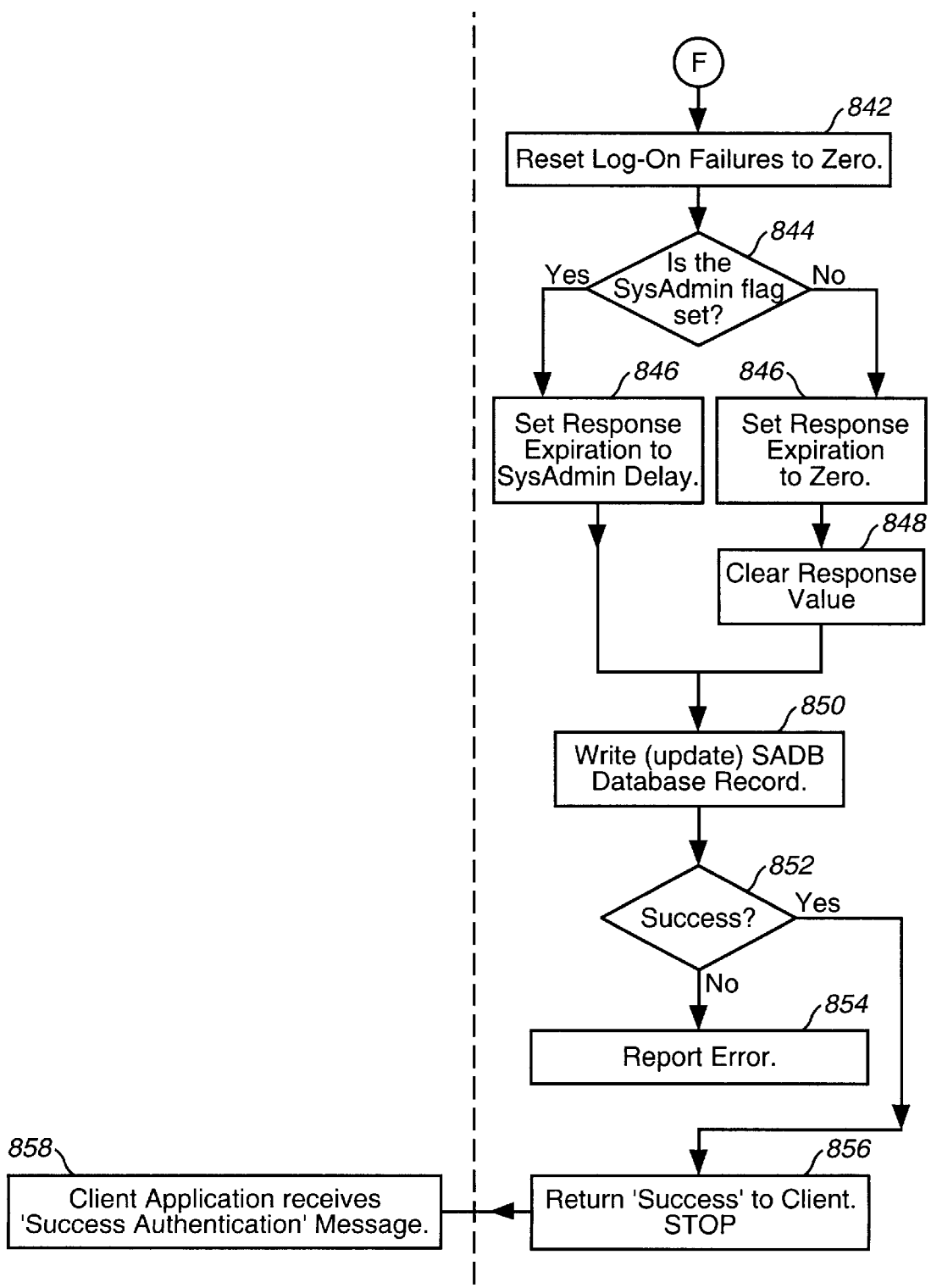

Referring to FIGS. 8a–8c, validation of a user's response is shown. Beginning in step 802, the client 102 inputs the challenge 126 received from the server 104 into the SHA 128, together with the serial number 122 and SADB password 124. The SHA 128 generates the response 130. In step 804, the client 102 sends the generated response 130 to the server 104, together with the user's account ID to the server 104. In step 806, the server 104 receives the response 130 generated by the client 102, together with the user's account ID.

In step 808, the server 104 retrieves the user's account table 200 from the user account database 120 based on the received user account ID. If the server 104 fails to retrieve the user's account, then in step 810 the server 104 returns a failure message to the client 102. In step 812, the client 102 notifies the user that authentication has failed.

If the user's account table 200 was retrieved, then in step 814 the server 104 determines whether the lock-out timer is set and not expired, in a manner similar to that described above with respect to step 610. If the lock-out timer is set and not expired, then in step 816 the server 104 returns a failure flag to the client 102. In response thereto, the client 102 in step 818 notifies the user that authentication has failed.

If the lock-out timer is not set, then in step 820 the server 104 determines whether the response valid timer has expired. Even if a valid response is received from the client 102, but the valid response timer has expired, then the response is considered invalid. The server 104 can determine a state of the response valid timer based on the response timer record 216 of the table 200. If the response valid timer has expired, then in step 822 the server 104 returns a failure flag to the client 102. In response thereto, the client 102 in step 824 notifies the user 114 that authorization has failed.

If the response valid timer has not expired, then in step 826 the server 104 determines whether the received response 130 is correct by comparing the received response to the expected response previously computed and stored in the expected response record 214. If the response is not correct, then in step 828 the server 104 increments the failures value stored in the failures record 208 of the table 200. Thereafter, the server 104 in step 830 determines whether the maximum number of allowed failures has been achieved by comparing the failures value in the failures record 208 to the set value (e.g., 3 or 5 consecutive failures). If not, then in step 832 the server 104 returns a failure message to the client 102. Thereafter, in step 834, the client 102 notifies the user that authentication has failed. If the maximum number or set of failures has been reached in step 830, then in step 836 the server 104 initiates the lock-out timer by setting the lock-out timer record 212. Thereafter, in step 838 the server 104 returns a failure flag to the client 102, and the client 102 in step 840 notifies the user 114 that authentication has failed.

If the received response 130 was correct in step 826, then in step 842 the server 104 resets the failures value record 208 to zero. In step 844, the server 104 determines if the SysAdmin flag or user account ID indicates system administration authorization request. If the SysAdmin flag is set, then in step 846 the server 104 sets the response timer in the response timer record 216 to a SysAdmin re-authentication delay value. The SysAdmin re-authentication delay value represents the time allowed to pass between re-authentication when the system is used for successive authentications, without the user needing to perform multiple successive SADB challenge/response calculations. As a result, a system administrator can perform numerous functions and have multiple successive accesses to the server 104. If the SysAdmin flag is not set, then the response timer is set to zero, and, in step 848, the server 104 clears or sets to null the expected response value.

In step 850, the server 104 writes or updates the response timer and expected response records 216 and 214 in the user's account table 200. In step 852, the server 104 determines whether the user's account table 200 has been successfully updated. If not, then an error is reported in step 854 by the server 104. A system administrator can then attempt to correct the error. Such an error can be reported by email, pager or other known means, as described above under step 666. Thereafter, in step 856 the server 104 returns a success flag to the client 102. In response thereto, the client 102 receives the success flag indicating to the client that it can access the server 104. The client 102 can inform the user 114 that authentication was successful, or simply allow user access to the server 104.

Figure 7A:
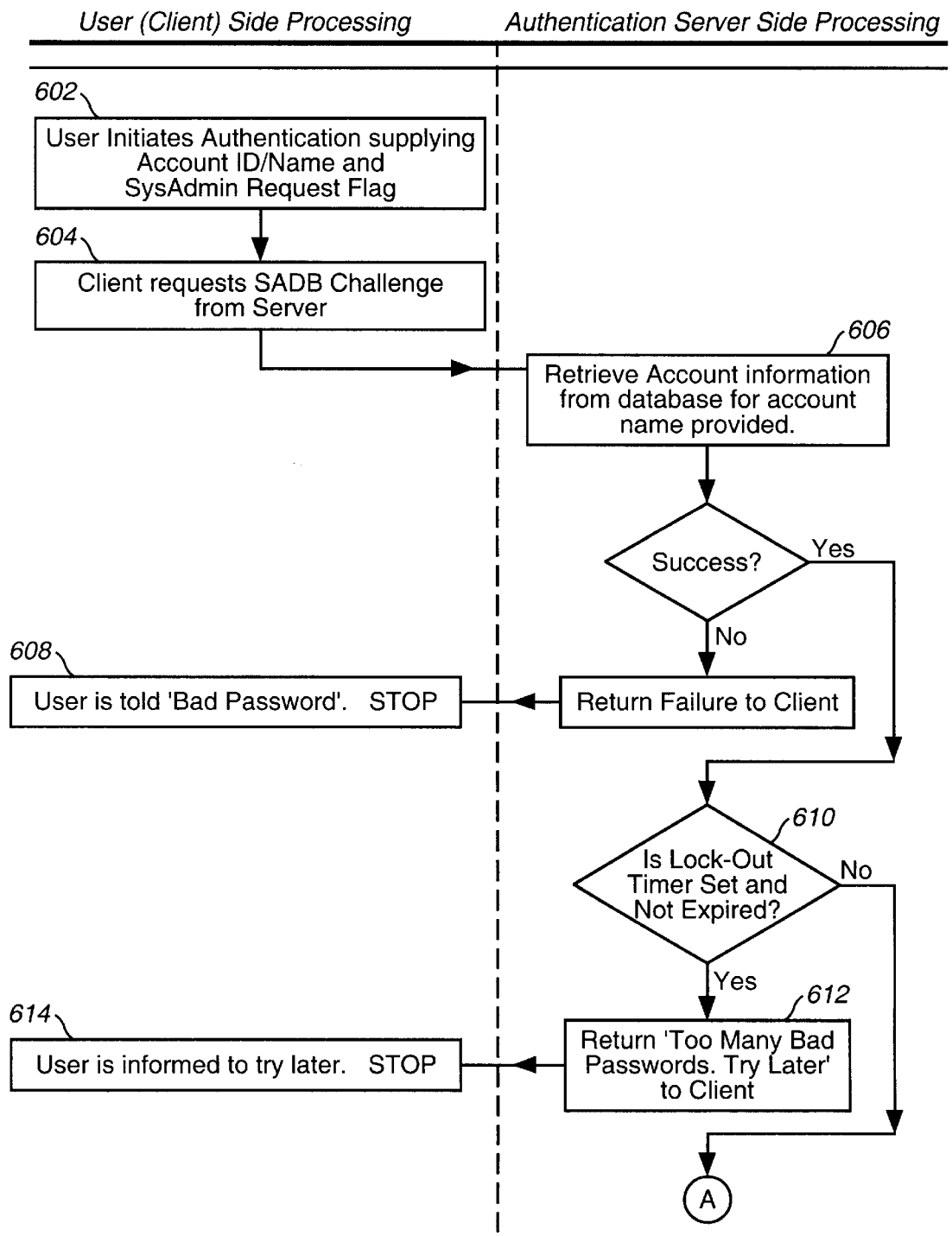
FIGS. 7a, 7b, 7c and 7d together form a flowchart diagram showing a first half of a personal authentication process under the exemplary embodiment.
Figure 7B:
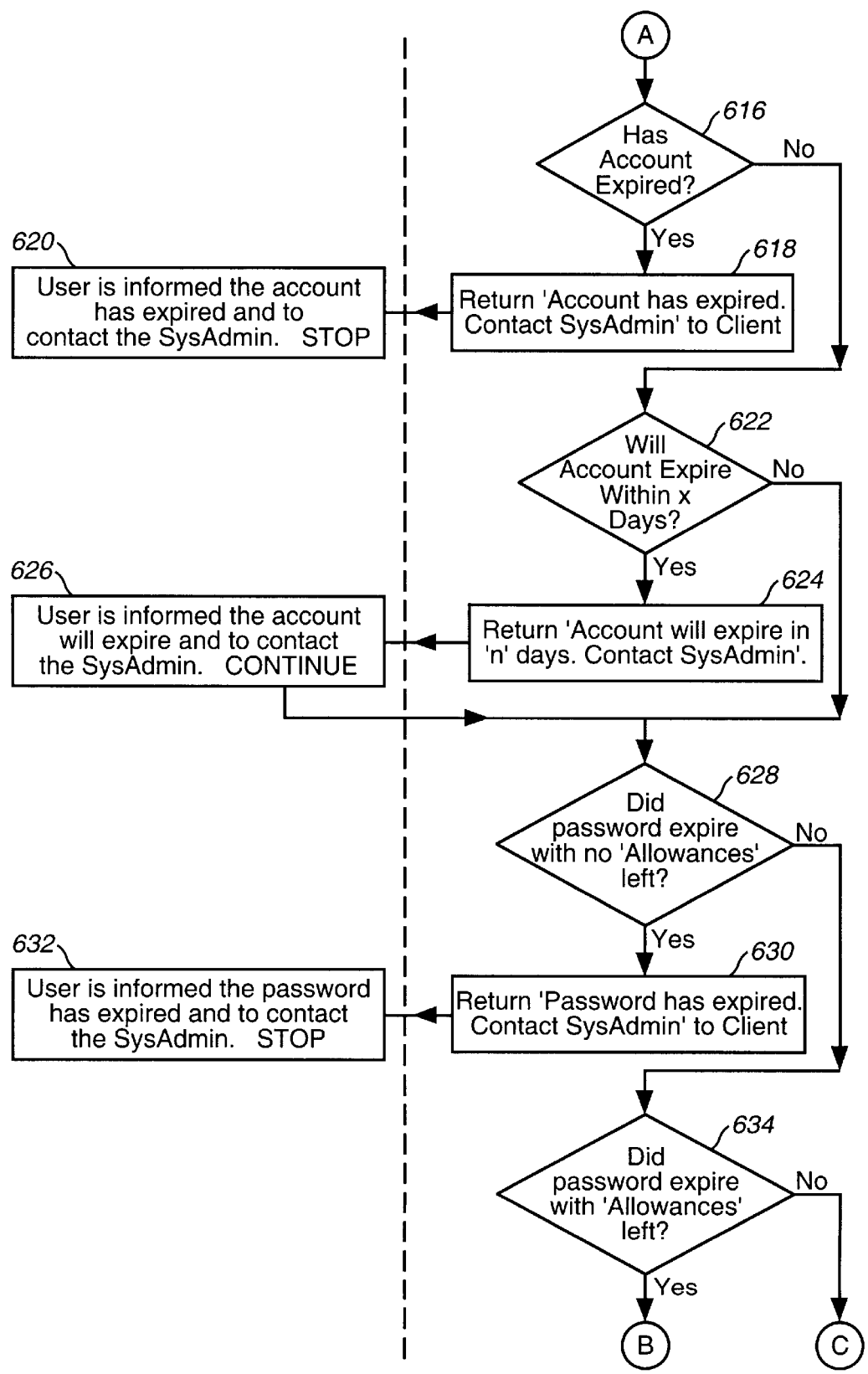
Figure 7C:
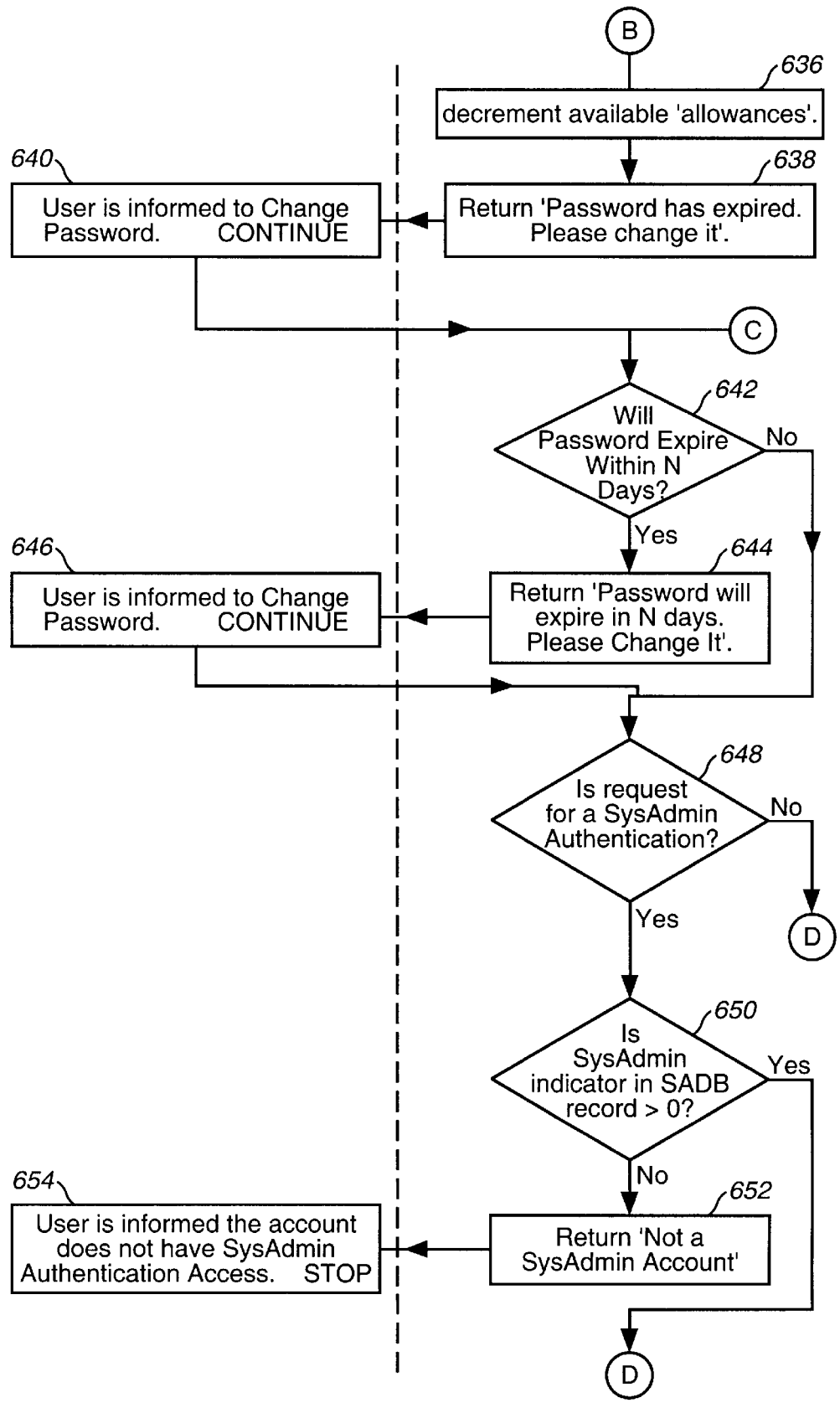
Figure 7D:
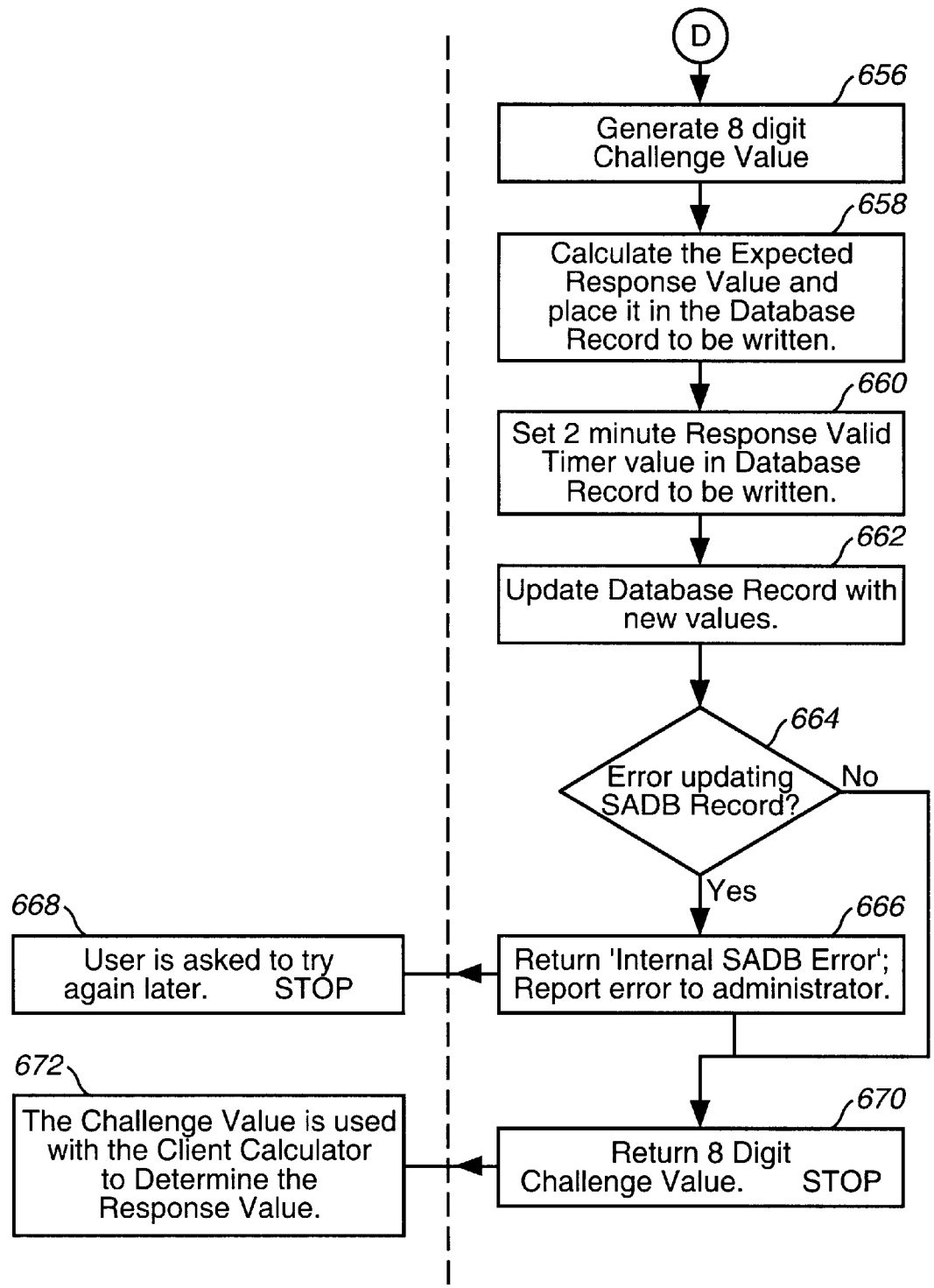

FIG. 9 shows an exemplary screen or GUI output provided by the client 102 to the user 114 during authorization, such as during step 672 (FIG. 7d). The display screen of FIG. 9 is for a Microsoft Windows version of the client SADB calculator 110. The system preferably includes similar client SADB calculators 110 for using DOS, UNIX, Macintosh, and other software/hardware platforms. Due to platform features and limitations, each implementation of the client SADB calculator is somewhat different, but achieves the same result. The core calculation algorithm (e.g., the SHA 128) is the same for all platforms.

The client SADB calculator 110 avoids "scripting" to avoid a user from inputting his or her password as a run-time parameter and thereby automate the entire authentication process. To discourage users from attempting to automate the entire authentication process, the user's authentication password must be entered interactively. As a result, human interaction in the authentication process is required.

Figure 9A:
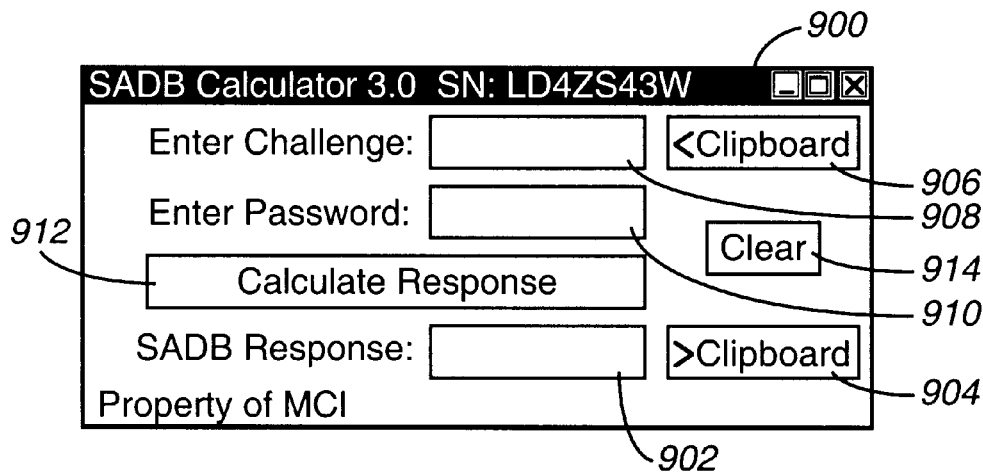
FIG. 9a is a front view of a computer screen showing a window for a client calculator.

As shown in FIG. 9a, the user 114 enters the challenge 126 that has been generated by the server 104 into the calculator's 'Enter Challenge' field 908. This may be entered by the user typing it in, or by pressing a button 906 if the user had previously cut or copied the challenge 126 into the client's clipboard buffer. Thereafter, the user 114 must enter his or her SADB password 124 in the password field 910 and thereafter depress a calculate response button 912 to generate the response 130 which will then be displayed in the response field 902. The user 114 uses the response value 130 displayed in the response field 902 with the client for authentication. If the client application requiring authentication allows data entry from the clipboard through some type of paste command, the user can press the button 904 to copy the response value to the client's clipboard thus avoiding typing the response by hand. A clear button 914 may be provided to clear the fields 908, 910, and 902.

To avoid the need to distribute client SADB calculators 110 having specific serial numbers for specific users, and having to recreate such calculators when a user needs a replacement, client SADB calculators are preferably distributed without embedded serial numbers. The users 114, instead, input the serial number 122 to customize each client SADB calculator 110. One benefit of such non-serialized client SADB calculators 110 is that the system need only provide a single client SADB calculator 110 for various hardware and software platforms for the client 102, rather than a specific calculator for each user.

Figure 9B:
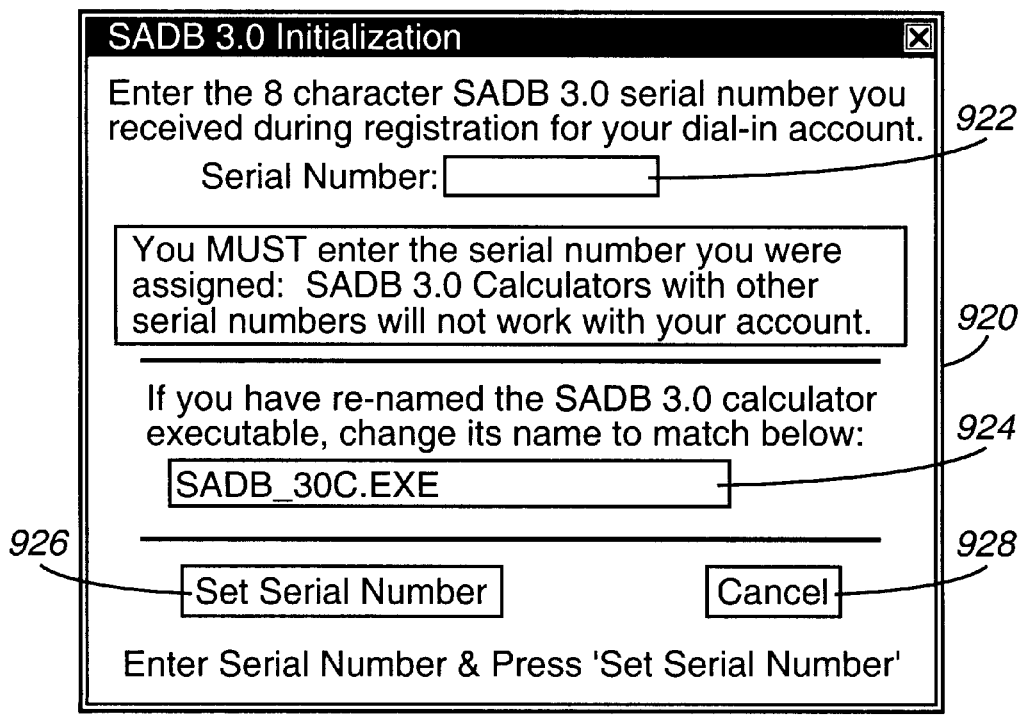
FIG. 9b is a front view of a computer screen showing a window for initializing the client calculator.

Referring to FIG. 9b, an exemplary window is shown for display to the user 114 by the client 102 to initialize or serialize the client SADB calculator 110. In a field 922, the user 114 enters the serial number 122 he or she receives from the system administrator or another person or organization when initially establishing an account with the server 104. A field 924 displays a file name for the client SADB calculator 110, and instructs the user 114 to change the name of his or her calculator if the user has changed the name. A set serial number button 926 initializes the client SADB calculator 110 after the user has input his or her serial number into the field 922, while a cancel button 928 allows the user 114 to cancel the operation.

When the button 926 is selected, the serial number 122 is written directly into an executable portion of the client SADB calculator 110 at a predefined location within the code. All future executions of the client SADB calculator 110 check this predefined location for the existence of a serial number, and finding the serial number 122, cause the calculator to appropriately execute as a calculator as shown as window 900. Without such a serial number, the client SADB calculator 110 is configured to execute as shown as window 920. The client SADB calculator 110 does not display the window 920 after a serial number 122 has been set.

The server 104 records audit information for each log-on attempt. Such records include a date and time stamp for each log-in attempt. The recorded information may include other additional information, such as an IP address for the client 102, a caller ID number (ANI) particularly with the dial-in connection over ISDN lines, or any other information that may be determined from the authentication attempt should it represent a failure. Additionally, the server 104 may include Remote Authentication Dial-In User Service (RADIUS) logs which provide additional information regarding each log-in attempt authorization (success or failure). The server 104 may employ a dynamic host configuration protocol (DHCP) method of assigning IP addresses to each dial-in session, where each IP address is selected from a pool of addresses. As a result, each session may have associated therewith an IP address which can help further provide an audit trail for authorization attempts. Such audit information may not only help improve security of the system, but also help determine processing loads and help forecast equipment needs for resource allocation purposes.

Figure 10:
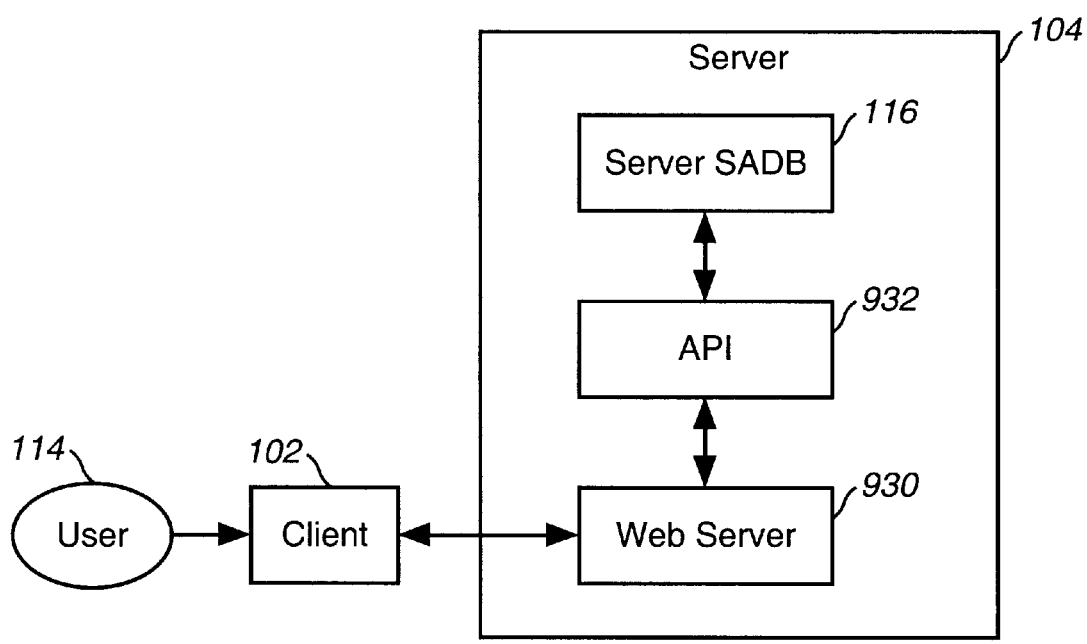
FIG. 10 is a block diagram showing a first alternate embodiment of the present invention.

Referring to FIG. 10, a first alternate embodiment of the present invention is shown. This alternate embodiment and those described below are substantially similar to the previously described embodiments. Only significant structure and operation are described in detail below.

As shown in FIG. 10, the server 104 includes a TCP/IP based web server 930 that provides to the client 102 (over the network 100, not shown in FIG. 10) several hypertext markup language (HTML) pages or other displayable screens to the user 114. Therefore, the client 102 can interact with the server 104 via several HTML pages to thereby provide a graphical interface to the user 114. The web server 930 can provide a means for the user 114 to update his or her user account table (e.g., change a password), or provide copies of the client SADB calculator 110.

An application programming interface (API) 932 is coupled between the server SADB calculator 116 and the web server 930. The API 932 is called by the server SADB calculator 116 to facilitate authentication of the user 114. When the server SADB calculator 116 initially authenticates the user 114, the correct response 130 produced by the client SADB calculator 110 is maintained for a predetermined time period by the client SADB calculator 116. Under such an embodiment, the server 104 does not set the timer and response to zero, as described above for steps 846 and 848, but instead sets the timer and response to values similar to that for the SysAdmin account. For example, the response is stored in the user's account table 200, together with a suitable delay period (e.g., 15 minutes).

Following authentication, whenever the user 114 accesses a new web page, where such web page requires authentication, the user SADB server 116, via the API 932, confirms to the web server 930 that the user 114 has been authenticated. The API 932 essentially authenticates the user 114 without user involvement. Additionally, the API 932 reduces some of the processing overhead required for user authentication by the server 104. When the user is, for example, entering data to a form on a web page to request a certain process to be performed (e.g., by a common gateway interface (CGI) program), the user's account ID and previously generated response are attached to the form as a hidden field. Before the web server 930 branches to the requested CGI program, the web server first detects the presence of the account ID and response in the hidden fields. The web server 930 forwards the account ID and response to the API 932, which performs authentication in a manner substantially similar to that described above with respect to the server 104. If authenticated, the API 932 sends an authentication to the web server 930, which then provides the switch to the requested CGI program.

When the user 114 is finished accessing the web server 930, the user indicates such to the web server 930. Thereafter, the web server 930 calls the API 932 and indicates to the SADB calculator 116 that the user 114 is finished. The server SADB calculator 116 then deletes the response and sets the delay to zero in the user account table 200. If an unauthorized user accesses the client 102 and attempts to access the web server 930, the unauthorized user will be unable to access any web pages that require authentication. The web server 930 will call the API 932 for confirmation of the authentication from the server SADB calculator 116. Since the client's response is no longer stored in the user's account table 200, the server SADB calculator 116 will fail to provide authentication.

Figure 11A:
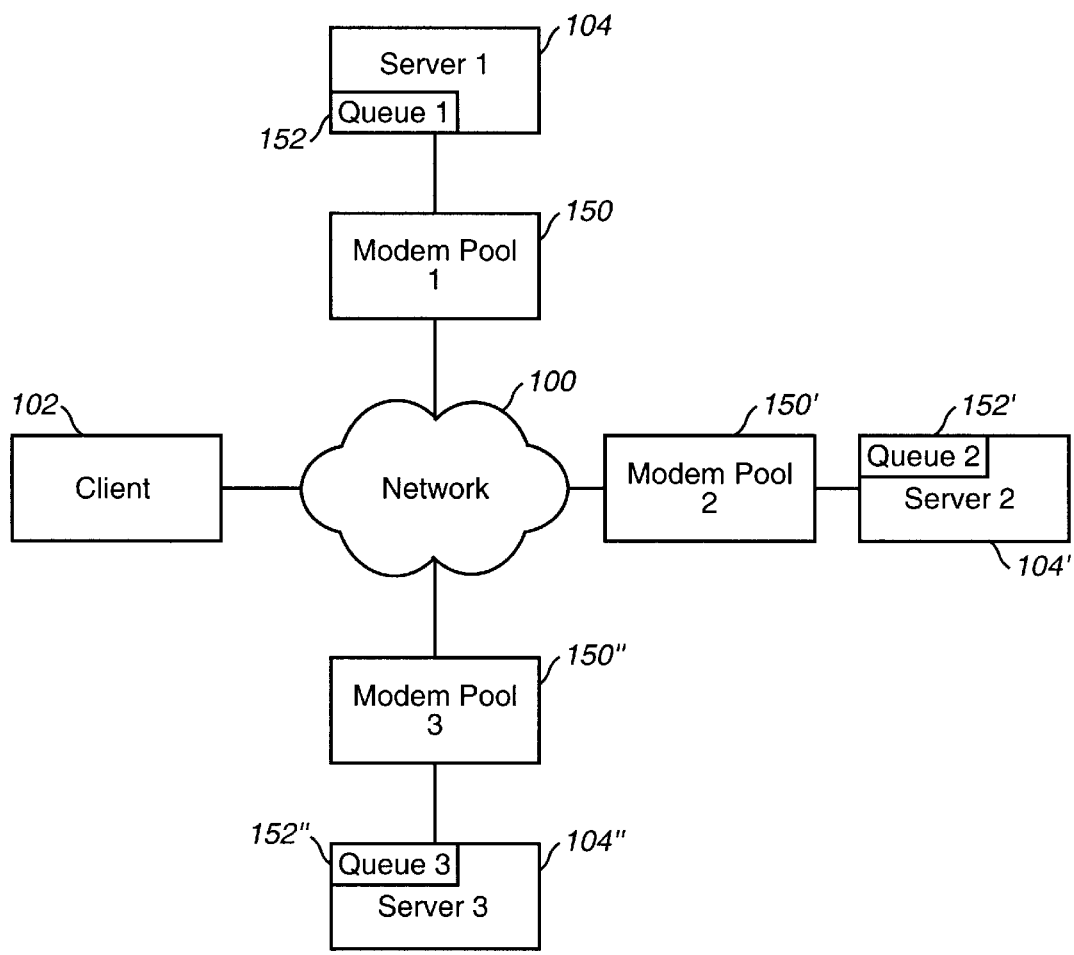
FIG. 11a is a block diagram showing a second alternate embodiment of the present invention.
Figure 11B:
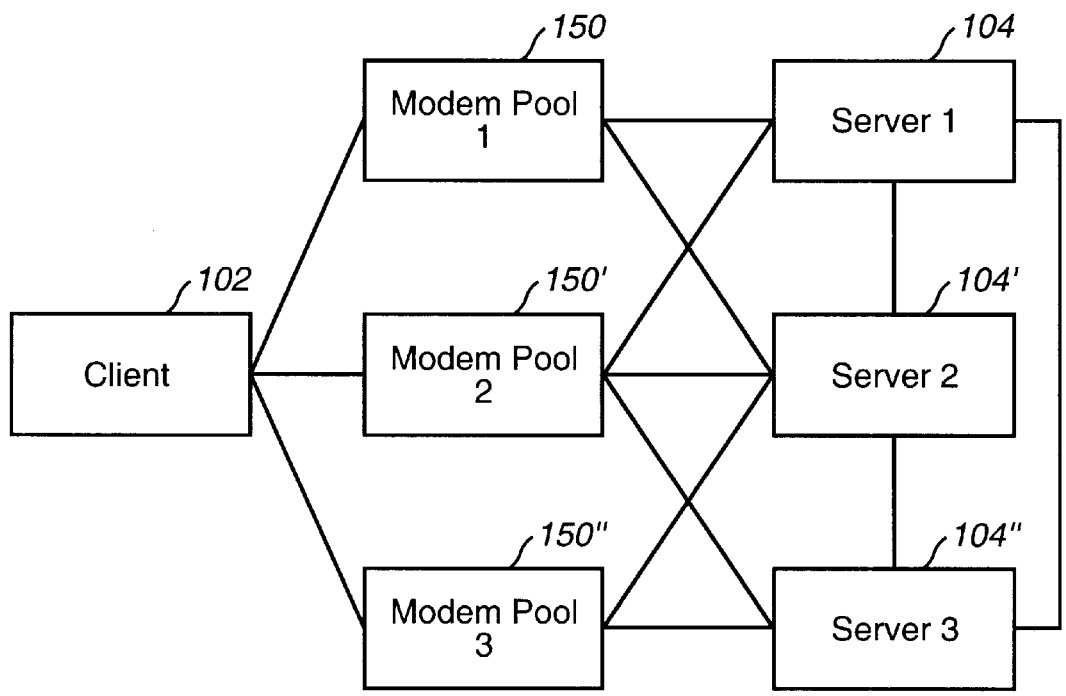

Referring to FIGS. 11a and 11b, further alternate embodiments of the present invention are shown. As shown in FIG. 11a, the client 102 is coupled to the server 104 via a modem pool 150. Similarly, the client 102 is coupled to a server 104' via a modem pool 150' and a server 104" via a modem pool 150". For reasons of network reliability through redundancy and efficiency of network routing, multiple servers 104, 104' and 104" are provided to the client 102. The servers 104, 104' and 104" are preferably geographically distributed. No matter where the client 102 is located, the client can dial a single number (e.g., a single toll-free number) to access a geographically closest server. The network 100 preferably employs a point-of-origination routing to route the client 102 to the modem pool of the closest server.

As shown in FIG. 11b, the logical connectivity of the servers 104, 104' and 104" is shown. Each of the modem pools 150, 150' and 150" are coupled to two or more of the servers 104, 104' and 104", where all servers are considered equal or primary servers. Each of the servers 104, 104' and 104" is coupled to each other.

When the user 114 establishes a new account on one of the servers 104, 104' and 104", the new account is recorded as the user account table on the server's local user account database 120 (not shown in FIG. 11b). The server then transmits the new account information (e.g., the user account table 200) to the other two servers in a database mirroring arrangement. The user account table 200 is not transmitted to the other servers as clear text, but instead is encrypted. Any updates made to the user account table 200 by any one of the servers is similarly transmitted to the other servers.

More particularly, as shown in FIG. 11a, each of the servers 104, 104' and 104" include queues 152, 152' and 152", respectively, for temporarily storing data that is to be exchanged with the other servers. Each of the servers forwards data which it wishes to exchange to its respective queue, and a service running with the queue forwards the data to the other servers. For example, the server 104 updates the user account table 200. The updated data is forwarded to the queue 152. The server running with the queue 152 checks the queue and determines that such unsent data is currently being stored in the queue 152. The server then forwards the data to the other two servers 104 and 104'.

If any of the queues 152, 152' and 152" become too full, the respective server 104, 104' or 104" may page a system administrator to help facilitate the exchange of data and thereby ensure that no data is lost. Additionally, each of the servers 104, 104' and 104" includes a database mirroring routine to ensure that all data in their local user account databases is identical to the data in the other databases. The database mirroring routine employs time stamps for data stored in the database, and the servers are in timed synchronism with each other, to facilitate such mirroring. Under the embodiment of FIGS. 11a and 11b, no matter where the client 102 is located, the user 114 can dial a single number to be routed to the nearest server, and still be authenticated by that server, since that server contains the same user account database 120 as the other servers. In other words, each user account database 120 coupled to the servers 104, 104' and 104" include the user's account table 200, including the user's SADB password 124 and serial number 122 associated with the user's account ID 202. During an authorization attempt, however, the servers 104, 104' and 104" do not mirror the user's 114 response to a challenge. The redundant and distributed architecture of FIGS. 11a and 11b provide enhanced system security so that no single point of failure will prohibit the client 102 from accessing the system.

Figure 12:
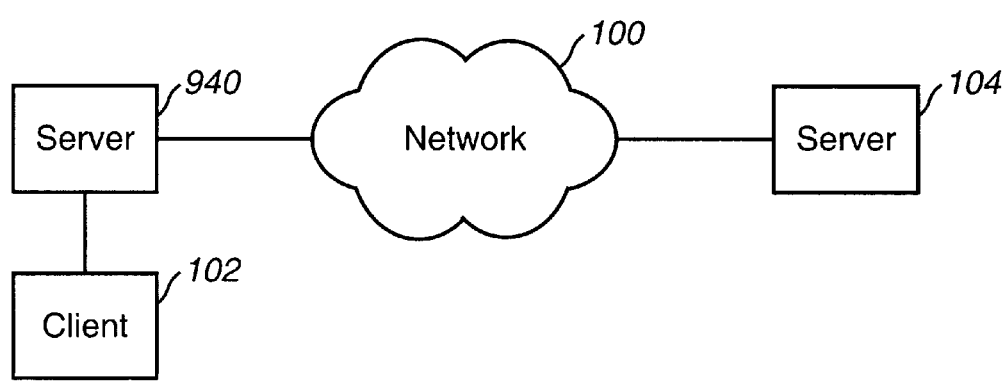
FIG. 12 is a block diagram showing a third alternate embodiment of the present invention.

In another alternate embodiment illustrated in FIG. 12, the client 102 is coupled to a server 940. The server 940 in turn is coupled to the server 104 via the network 100. The user of the client 102 requests authentication, and the server 940 lacks the authentication routine described above. Therefore, the server 940 communicates with the server 104 to authenticate the user of the client 102. Specifically, the server 940 addresses one of numerous ports on the server 104. The server 104 initially requires authentication of the server 940, and vise versa. The server 104 first determines whether the server 940 exists within a table of acceptable servers in the user account database 120, or another suitable database. If the server 940 exists within the table, then the server 104 and server 940 exchange passwords with each other to authenticate each other. In general, all data exchanged between servers in all embodiments is sent in encrypted format, such as using the known data encryption standard (DES).

After the server 104 and server 940 have authenticated each other, the server 940 forwards the user's account ID and request for authorization to the server 104. In response thereto, the server 104 performs the above described steps of FIGS. 7 and 8 to authenticate the user of the client 102; the server 940 simply acts as a pass-through for data exchanged between the server 104 and the client 102. After the user of the client 102 is authenticated, the server 104 drops the connection with the server 940.

In an alternate configuration, the server 104 or the server 940 can transmit a new password with the challenge 126 or other data exchanged therebetween. Therefore, when the server 104 and server 940 again attempt to authenticate each other, the new password previously transmitted is used for authentication.

Although specific embodiments of, and examples for, the present invention are described herein for illustrative purposes, various equivalent modifications can be made without departing from the spirit and scope of the invention, as will be recognized by those skilled in the relevant art. The teachings provided herein of the present invention can be applied to other communications or network systems, not necessarily the exemplary computer network described above. While certain operations under embodiments of the present invention have been described as occurring generally in a serial fashion, those skilled in the relevant art will recognize that it is entirely within the scope of the invention to conduct some operations more or less simultaneously, or in another order from that described herein.

These and other changes can be made to the embodiments of the invention in light of the above detailed description. In general, in the following claims, the terms used should not be construed to limit the invention to the specific embodiments disclosed in the specification, but should be construed to include any authentication system that operates under the claims to provide system security. Accordingly, the invention is not limited by the disclosure, but instead its scope is to be determined entirely by the following claims.

We claim:

1. In a computer network having a client and a server, a method comprising the steps of:

providing an account password and an account name by the client;

at the server, comparing the account password and account name to a database of account names and associated account passwords;

providing a challenge to the client;

at the client, producing a response to the challenge using the challenge and at least a user password;

transmitting the response to the server, but not the user password;

at the server, producing a local response based on the challenge and the user password, the user password being stored in the database and being associated with the account name;

authorizing access to the server if the local response favorably compares to the received response; and prohibiting authorized access to the server for an increasing period of time if the local response does not favorably compare to the received response, the period of time increasing after each set of failures to favorably compare.

2. The method of claim 1 wherein the step of prohibiting includes:

incrementing an authorization failures value in the database for each consecutive occurrence that the local response does not favorably compare to the received response;

prohibiting authorized access for a first period of time if the authorization failures value equals a set value;

again incrementing the authorization failures value for each consecutive occurrence that the local response does not favorably compare to the received response until the authorization failures value again equals a multiple of the set value; and prohibiting authorized access for the first period of time times a multiplier value if the authorization failures value again equals the multiple of the set value, where the multiplier value is greater than one.

3. The method of claim 1, further comprising the steps of:

at the client, receiving a client calculator from the server; and initializing the client calculator for the client by inputting a number assigned to the client.

4. The method of claim 1 wherein the step of producing includes:

providing a one-way response generating algorithm;

inputting the challenge, the user password and a predetermined number to the one-way algorithm, wherein the predetermined number corresponds to the client; and generating the response based on the step of inputting.

5. The method of claim 1 wherein the step of providing a response includes providing a response having a length of fewer than 15 alphanumeric characters, and wherein the response does not include vowels or include alphanumeric characters visually confusing with other alphanumeric characters.

6. The method of claim 1 wherein the step of comparing includes:

determining if a life-time of the account password has expired;

if the account password has expired, then determining if a number of allowances remain for the user's account;

if a number of allowances remain, then performing the step of providing a challenge; and if a number of allowances does not remain, prohibiting authorized access to the server.

7. An electronic access method for use by a user comprising the steps of:

providing a challenge to the user and producing a local response to the challenge using the challenge and at least a locally stored value;

receiving a response to the challenge from the user;

authorizing access if the local response favorably compares to a received response; and prohibiting authorized access for an increasing period of time if the local response does not favorably compare to the received response, wherein the period of time increases after each failure to favorably compare.

8. The method of claim 7 wherein the step of prohibiting includes:

incrementing an authorization failures value for each consecutive occurrence that the local response does not favorably compare to the received response;

prohibiting authorized access for a first period of time if the authorization failures value equals a set value;

again incrementing the authorization failures value for each consecutive occurrence that the local response does not favorably compare to the received response until the authorization failures value again equals a multiple of the set value; and prohibiting authorized access for the first period of time times a multiplier value if the authorization failures value again equals the multiple of the set value, where the multiplier value is greater than one.

9. The method of claim 7, further comprising the steps of:

providing a calculator to the user; and providing a number for inputting to and initializing the calculator.

10. The method of claim 7 wherein the step of providing includes:

providing a one-way response generating algorithm;

inputting the challenge and the user password to the one-way algorithm; and generating the response based on the step of inputting.

11. The method of claim 7 wherein the step of providing includes providing a challenge that is comprised of alphanumeric characters and lacks predetermined characters.

12. The method of claim 7 wherein the step of providing includes:

determining if a life-time of a user account password has expired;

if the account password has expired, then determining if a number of allowances remain for the user;

if a number of allowances remain, then performing the step of providing a challenge; and if a number of allowances does not remain, prohibiting authorized access.

13. A computer-readable medium having stored thereon a computer-readable data structure for use by a server in an authorization procedure, the server being networked to at least one client, the data structure comprising:

an identifier data structure;

a password associated with the identifier data structure, the password having a time period indicating a period during which the password is valid;

an allowances value indicating a number of authorizations permitted under the authorization procedure after the period that the password is valid has expired;

a serial number data structure associated with the client; and a response data structure, the response data structure storing a response produced by the server from a server calculator, the server calculator generating the response based on a server generated challenge, the serial number and the password, wherein the password is associated with a user of the account, and wherein the response is compared with a response received from the client.

14. The computer-readable medium of claim 13, further comprising:

a log-in failures data structure storing a number of consecutive log-in failures associated with the account; and a lock-out timer data structure indicating a duration during which the user is prohibited from logging into the server, wherein the lock-out timer record indicates a non-linearly increasing time period during which the user is prohibited from logging into the server after consecutive sets of failed log-on attempts.

15. The computer-readable medium of claim 14 wherein the identifier data structure is a user account record identifying an account assigned to a user, and wherein the password and allowances value correspond respectively to a password record and an allowances value record.

16. In a computer network having at least one client, an apparatus comprising:

a user account database having stored therein a first password associated with a user account; and a first server coupled to the database and being programmed for receiving an authorization request from the client for the user account, including a response, generating a local response based on the first password and a locally generated seed value, permitting access to the first server by the client if the local response favorably compares to the received response, and prohibiting access to the first server by the client for an increasing time period for each group of failed authorization attempts for the user account, the server is programmed for incrementing an authorization failures value in the database for each consecutive occurrence that the local response does not favorably compare to the received response; prohibiting authorized access for a first period of time if the authorization failures value equals a set value; again incrementing the authorization failures value for each consecutive occurrence that the local response does not favorably compare to the received response until the authorization failures value equals a multiple of the set value; and prohibiting authorized access for the first period of time times a multiplier value if the authorization failures value equals the multiple of the set value, where the multiplier value is greater than one.

17. The apparatus of claim 16, further comprising a web server coupled to the client, and an interface coupled between the web server and the first server, wherein the web server provides a plurality of displayable screens to the client, and wherein the interface provides a plurality of authorizations for the web server.

18. The apparatus of claim 16, further comprising at least a second server coupled to the first server over the network, wherein the second server is physically distant from the first server and includes another account database having stored therein the first password associated with the user account.

19. In a computer network having a client and first and second servers, a method of authorizing a user comprising the steps of:

receiving at the first server a request for user authorization by the client;

receiving at the second server a request for authorization by the first server;

providing authorization between the first and second servers;

at the second server, providing a challenge to the first server;

at the first server, providing the challenge to the client;

at the client, producing a response to the challenge using the challenge and at least a user password;

transmitting the response, but not the user password, to the first server;

forwarding the response to the second server;

at the second server, producing a local response based on the challenge and the user password; and at the second server, authorizing access if the local response favorably compares to the received response.

20. The method of claim 19 wherein the step of providing authorization between the first and second servers includes:

identifying at the second server that the first server is authorized;

forwarding a first server password to the second server from the first server;

forwarding a second server password to the first server from the second server;

at the first server, comparing the second server password to a locally stored second server password; and at the second server, comparing the first server password to a locally stored first server password.

21. The method of claim 19 wherein the step of providing a challenge to the first server includes providing to the first server a new second server password.

22. The method of claim 19 wherein the step of forwarding includes providing to the second server a new first server password.

23. The method of claim 19 wherein the step of authorizing includes disconnecting communications with the first server following authorizing access.

24. The method of claim 19 wherein the step of providing a challenge to the first server includes:

at the client, providing an account password and an account name by the client to the first server;

forwarding the account password and account name to the second server; and at the second server, comparing the account password and account name to a database of account names and associated account passwords before providing the challenge.

25. In a computer network having at least one client, an apparatus comprising:

a user account database having stored therein a first password associated with a user account; and a first server coupled to the database and being programmed for receiving an authorization request from the client for the user account, including a response, generating a local response based in the first password and a locally generated seed value, permitting access to the first server by the client if the local response favorably compares to the received response, and prohibiting access to the first server by the client for an increasing time period for each group of failed authorization attempts for the user account, the server is programmed for distributing a client calculator, wherein the client calculator is initialized by inputting a number assigned to the client.

26. In a computer network having at least one client, an apparatus comprising:

a user account database having stored therein a first password associated with a user account; and a first server coupled to the database and being programmed for receiving an authorization request from the client for the user account, including a response, generating a local response based on the first password and a locally generated seed value, permitting access to the first server by the client if the local response favorably compares to the received response, and prohibiting access to the first server by the client for an increasing time period for each group of failed authorization attempts for the user account, the server is programmed for providing a one-way response generating algorithm, inputting the challenge and the user password to the one-way algorithm and generating the response.

27. In a computer network having at least one client, an apparatus comprising:

a user account database having stored therein a first password associated with a user account; and a first server coupled to the database and being programmed for receiving an authorization request from the client for the user account, including a response, generating a local response based on the first password and a locally generated seed value, permitting access to the first server by the client if the local response favorably compares to the received response, and prohibiting access to the first server by the client for an increasing time period for each group of failed authorization attempts for the user account, the server is programmed for determining if a life-time of a second password has expired, if the second password has expired, then determining if a number of allowances remain for the user account, if a number of allowances remain, then performing the step of providing a challenge, and if a number of allowances does not remain, prohibiting authorized access to the server, and wherein the second password is stored in the database and is associated with the user account.

\* \* \* \* \*